United States Patent [19]

Tsukada

[11] Patent Number: 5,087,812
[45] Date of Patent: Feb. 11, 1992

[54] INCREMENTAL ENCODER WITH DIRECTION-INDICATING SHUTTER

[75] Inventor: Jiro Tsukada, Wakuya, Japan

[73] Assignee: Alps Electric Co., Ltd., Tokyo, Japan

[21] Appl. No.: 606,010

[22] Filed: Oct. 30, 1990

[30] Foreign Application Priority Data

Nov. 20, 1989 [JP] Japan .................. 1-133918[U]

[51] Int. Cl.$^5$ ................................ G01D 5/34
[52] U.S. Cl. .................... 250/231.14; 250/237 G
[58] Field of Search ............... 250/231.14, 231.13, 250/237 G, 237 R; 356/375

[56] References Cited

U.S. PATENT DOCUMENTS

| | | | |
|---|---|---|---|
| 4,533,830 | 8/1985 | Beauprey | 250/231 SE |
| 4,559,448 | 12/1985 | Rozsa | 250/231.14 |
| 4,847,484 | 7/1989 | Kikuchi | 250/221 |
| 4,864,125 | 9/1989 | Minami et al. | 250/231.13 |

*Primary Examiner*—David C. Nelms
*Attorney, Agent, or Firm*—Guy W. Shoup; B. Noel Kivlin

[57] ABSTRACT

A light-transmission-type encoder usable in, e.g., an image scanner, and suitable for detecting both the amount of and the direction of rotation. An image scanner featuring the encoder is used to read an image on an original while utilizing the self-scanning direction of a self-scanning image sensor as the main scanning direction and a direction substantially perpendicular to the main scanning direction as the sub-scanning direction, then transfer a read-image signal to image memory of a host computer for recording and displaying. The encoder includes a rotary body having peripheral slits permitting light transmission therethrough, a shaft integrally supporting the rotary body, a shutter having a slit and being loosely and swingably fitted on the shaft, a spring for causing force of friction between either the shutter and the shaft or the shutter and the rotary body, a first light-emitter and a first light-receiver which are disposed with the rotary-body slits therebetween, and a second light-emitter and a second light-receiver which are disposed with the shutter slit therebetween. With this encoder, the image scanner detects the direction of rotation of the rotary body from the relation in position of the shutter slit with the second light-emitter and light-receiver, and adjusts, in accordance with the detected direction, the position in which the image signal is stored in the image memory.

8 Claims, 3 Drawing Sheets

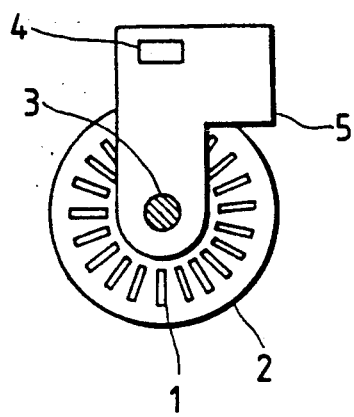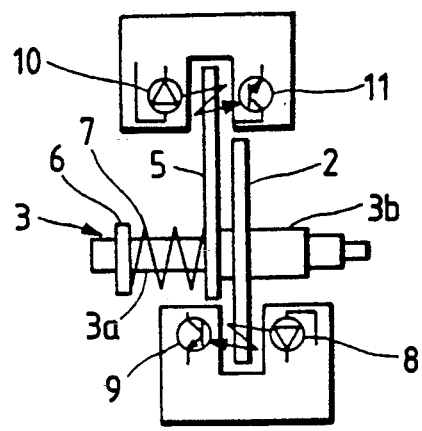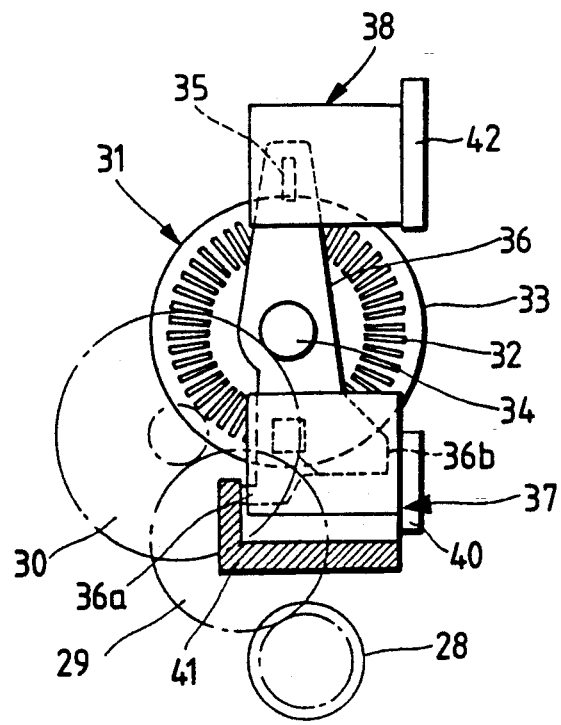

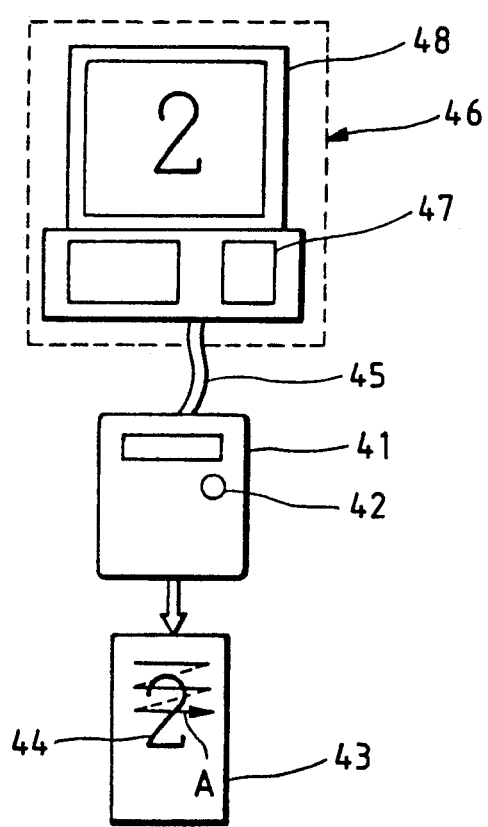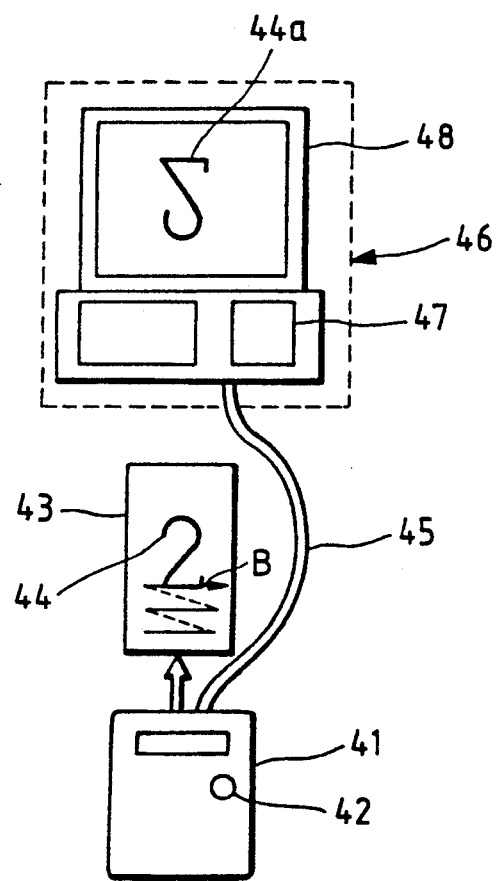
FIG. 5(a) PRIOR ART
FIG. 5(b) PRIOR ART

INCREMENTAL ENCODER WITH DIRECTION-INDICATING SHUTTER

BACKGROUND OF THE INVENTION

1. Field of the Invention

The present invention relates to a light-transmission-type encoder and an image scanner having a light-transmission-type encoder. More specifically, the present invention relates to a light-transmission-type encoder that can be manufactured at relatively low cost and that is suitable for detecting both the amount of rotation and the direction of rotation, and an image scanner having such a light-transmission-type encoder.

2. Description of Related Art

Hitherto, encoders of a two-phase type have been known, which includes a rotary body having a first position information pattern disposed radially at a constant pitch from an annular common pattern described concentrically with respect to a rotary shaft, and a second position information pattern shifted in phase by a ¼ pitch from the first position information pattern, and which is adapted to detect both the amount of and the direction of rotation.

Such a two-phase type encoder detects the first position information pattern with a first detecting body, and detects the second position information pattern with a second detecting body, so as to obtain two pulse signals shifted from each other in phase by 90 degrees. The encoder counts the pulses of the pulse signals so as to output a signal indicative of the number of revolutions of the rotary shaft during forward and backward rotation of the shaft. The encoder also outputs a signal indicative of the direction of rotation of the rotary shaft from a difference signal expressing the difference (in phase) between the two pulse signals.

Referring to FIGS. 5 (a) and 5 (b), there are shown different relations between reading and displaying which can be established when a conventional image scanner reads an original.

In the reading shown in FIG. 5 (a), a conventional image scanner 41 is manually moved by the user, who is also depressing a reading start switch 42 of the scanner 41, on an original 43 in a certain direction, e.g., from above to below as viewed in FIG. 5 (a), whereby the scanner 41 reads an image 44 on the original 43 sequentially in the direction indicated by an arrow A. Then, the image 44 read from the original 43 is stored into an image memory 47 of a host computer 46 connected with the scanner 41 via a cable 45. The stored image is either displayed on a monitor 48 or output as hard copy by a printer, not shown.

In the above-described image scanner 41, the main scanning direction is set as the self-scanning direction of a self-scanning image sensor (not shown), while the sub-scanning direction is set as a direction substantially perpendicular to the main scanning direction, that is, as the direction in which the entire image scanner 41, i.e., the scanner 41 body, is moved by the user. While the image scanner 41 reads an image 44 on an original 43 as described above, a single-phase encoder (not shown) incorporated in the main body of the image scanner 41 detects the amount of movement of the image scanner 41 body and outputs a signal indicative of this detection.

Because the above-described conventional encoder requires both the first position information pattern and the second position information pattern, the rotary body of the encoder tends to become large. Further, in order to accurately detect the shift in phase between these position information patterns, the encoder must be manufactured with a relatively high level of precision. Therefore, the encoder cannot be manufactured with ease, nor can it be mass-produced efficiently. The large size of the rotary body and poor mass-producibility of the encoder inevitably entail high production cost. In order to improve the level of precision with which the encoder is manufactured, it is possible to employ larger position information patterns without making larger the rotary body. However, since the number of patterns provided inevitably decreases, it becomes necessary to increase the rotational speed of the rotary body. For this purpose, a special mechanism for transmitting rotary force must be provided, but with the risk that the rotary force transmitting mechanism may add noise generated by the entire device, and the risk that additional space as well as additional production cost for the mechanism may be necessary.

In the reading by the scanner 41 shown in FIG. 5 (b), the image scanner 41 body is moved in the direction opposite to the above, i.e., from below to above as viewed in FIG. 5 (b), and an image 44 on an original 43 is read sequentially as indicated by an arrow B. Since the encoder of the image scanner 41 is single-phase-type, the read image is stored in the memory 47 in its state of being inverted as compared to the case shown in FIG. 5 (a). Also, the monitor 48 displays an image 44a which is vertically inverted. In order to overcome this problem, it is possible to employ a two-phase-type encoder in the image scanner. However, incorporating a two-phase-type encoder involves the need to use a larger rotary body, and other risks, thereby failing to sufficiently overcome the problem.

SUMMARY OF THE INVENTION

The present invention has been made in view of the above-described circumstances. A primary object of the present invention is to provide a light-transmission-type encoder that is capable of detecting both the amount of rotation and the direction of rotation, yet has improved mass-producibility and has a compact rotary body.

A second object of the present invention is to provide a compact image scanner that is capable of providing a display image which is always in correct, or non-inverted, positional relation with the original image.

In order to achieve the primary object, according to a first aspect of the present invention, there is provided a light-transmission-type encoder including a rotary body having on its periphery slits permitting light to be transmitted therethrough, the encoder being adapted to detect both the amount of rotation and the direction of rotation of the rotary body. The encoder comprises: a shaft on which the rotary body is integrally mounted; a shutter having a slit and being loosely and swingably fitted on the shaft; a spring for causing force of friction between the shutter, on one hand, and either the shaft or the rotary body, on the other; a first light-emitter and a first light-receiver which are disposed with the slits of the rotary body positioned therebetween; and a second light-emitter and a second light-receiver which are disposed with the slit of the shutter positioned therebetween.

In order to achieve the above-stated second object, according to a second aspect of the present invention, there is provided an image scanner adapted to read an image while utilizing the self-scanning direction of a self-scanning image sensor as the main scanning direction and a direction substantially perpendicular to the main scanning direction as the sub-scanning direction, and transfer a signal indicative of the read image to image memory of a host computer so as to allow the image to be recorded and displayed. The image scanner comprises: a light-transmission-type encoder including a rotary body having on its periphery slits permitting light to be transmitted therethrough, a shaft on which the rotary body is integrally mounted, a shutter having a slit and being loosely and swingably fitted on the shaft, a spring for causing force of friction between the shutter, on one hand, and either the shaft or the rotary body, on the other, a first light-emitter and a first light-receiver which are disposed with the slits of the rotary body positioned therebetween, and a second light-emitter and a second light-receiver which are disposed with the slit of the shutter positioned therebetween; the image scanner detecting the direction of rotation of the rotary body on the basis of the relation in position of the slit of the shutter with the second light-emitter and the second light-receiver, and adjusting, in accordance with the detected direction of rotation, the position in which a signal indicative of the read image is stored in the image memory so as to allow a display of the image as it is in the correct positional relation with the image on the original irrespective of the direction of movement of the scanner body.

With the above-specified construction of the light-transmission-type encoder according to the present invention, when the shaft rotates, the rotary body, which is integral with the shaft, rotates together with the shaft, while the shutter, which is loosely fit on the shaft and is urged by the spring to generate force of friction between the shutter and either the shaft or rotary body, swings in agreement with the direction of rotation of the shaft and the rotary body. The first light-emitter and the first light-receiver, which are disposed with the slits of the rotary body positioned therebetween, cooperate with each other to sense the passage of the slits, then to output a signal indicative of the amount of rotation. On the other hand, the second light-emitter and the second light-receiver, which are disposed with the slit of the shutter positioned therebetween, cooperate with each other to sense the position of the swinging shutter, then to output a signal indicative of the direction of rotation. On the basis of the rotation-amount signal and the rotation-direction signal, it is possible to detect both the amount of and the direction of the rotation of the rotary body. Since the rotary body does not have any position information patterns of two types, the rotary body can be compact. Further, there is no need to give consideration to the shift in phase between the position information patterns, the level of precision with which the encoder must be manufactured can be relatively low, thereby improving the mass-producibility of the encoder.

With the above-described construction of the image scanner according to the present invention, the image scanner reads an image while the self-scanning direction of a self-scanning image sensor is used as the main scanning direction and a direction which is substantially perpendicular to the main scanning direction and in which the scanner body is moved is used as the sub-scanning direction, then outputs a signal indicative of the read image. At this time, the light-transmission-type encoder operates, in the same manner as above, to detect both the amount of and the direction of rotation, that is, to detect the amount of and the direction of the movement performed by the image scanner relative to the original in the sub-scanning direction, then outputs detection signals. Subsequently, the image signal is stored, in accordance with the detection signals, in image memory of the associated host computer. The data expressed by the image signal stored in the image memory are read from the memory while maintaining their relative position, then the read data are output as a displayed image. Therefore, it is possible to obtain a displayed image which is always in the correct positional relation with the image on the original irrespective of the direction in which the image scanner is moved.

BRIEF DESCRIPTION OF THE DRAWINGS

FIG. 1 is a front view showing the construction of the essential parts of one embodiment of a light-transmission-type encoder according to the present invention;

FIG. 2 is a side view of the light-transmission-type encoder;

FIG. 4 is a front view showing the construction of that part of the image scanner enclosed by broken lines in FIG. 3; and FIGS. 5 (a) and 5 (b) are views showing different relations between reading and displaying which can be established during the reading of a conventional image scanner.

DESCRIPTION OF THE PREFERRED EMBODIMENTS

Figure 3:
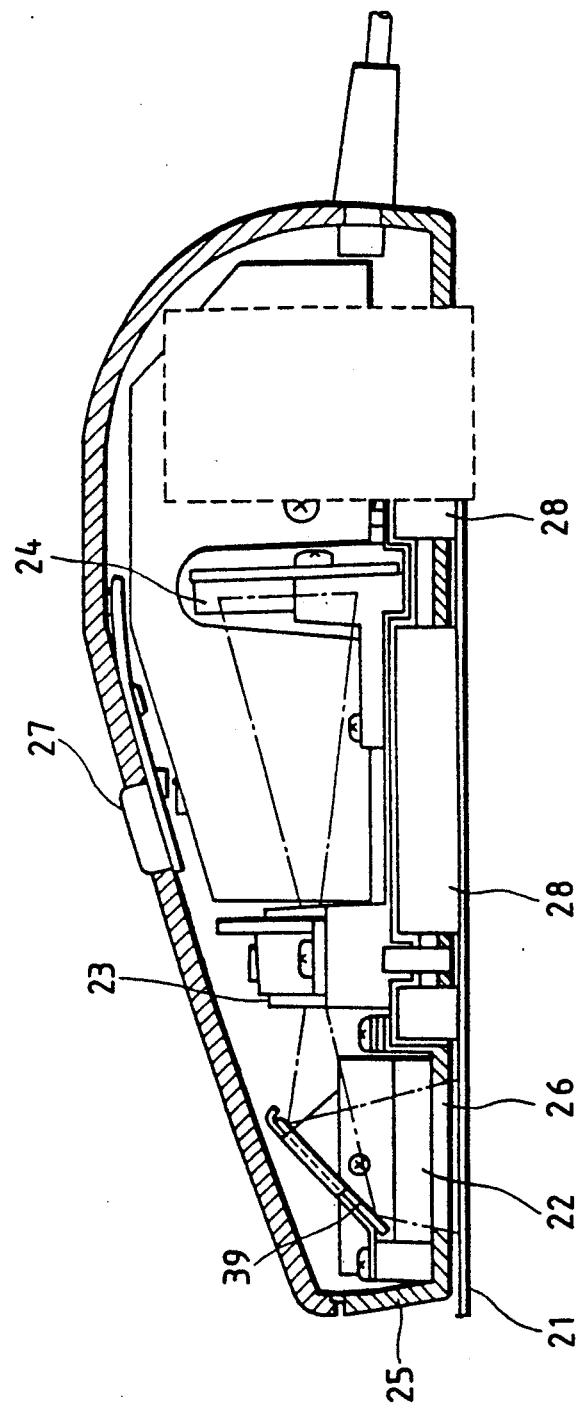
FIG. 3 is a vertical sectional view of one embodiment of an image scanner according to the present invention.

The preferred embodiments of a light-transmission-type encoder and an image scanner having the encoder, both according to the present invention, will be described with reference to the accompanying drawings.

FIG. 1 shows, in a front view, the construction of the essential parts of an embodiment of a light-transmission-type encoder according to the present invention, and FIG. 2 is a side view of the encoder.

The light-transmission-type encoder according to this embodiment includes, as shown in FIG. 1, a rotary body 2 having, on the periphery thereof, slits 1 permitting light to be transmitted therethrough, a shaft 3 on which the rotary body 2 is integrally mounted, and a shutter 4 being loosely and swingably fitted on the shaft 3 and having a slit 4. The encoder also includes, as shown in FIG. 2, a spring seat 6 secured to the shaft 3 and disposed as opposed to and spaced from the shutter 5, a spring 7 interposed between the shutter 5 and the spring seat 6 for causing force of friction between the shutter 5 and the shaft 3, a first light-emitter and a first light-receiver, such as a light emitting diode 8 and a photo-transistor 9, which are disposed with the slits 1 of the rotary body 2 positioned therebetween, and a second light-emitter and a second light-receiver, such as a light emitting diode 10 and a photo-transistor 11, which are disposed with the slit 4 of the shutter 5 positioned therebetween. The shaft 3 has a small-diameter portion 3a on which the shutter 5 is loosely fitted, and a large-diameter portion 3b on which the rotary body 2 is integrally mounted. The shutter 5 is biassed by the spring 7 in such a manner as to abut on the stepped surface between the small-diameter portion 3a and the large-diameter portion 3b.

With the above-described construction of the encoder, when the shaft 3 rotates, the rotary body 2, which is integral with the shaft 3, rotates together with the shaft 3, while the shutter 5, which is loosely fitted on the small-diameter portion 3a of the shaft 3 and is urged by the spring 7 interposed between the shutter 5 and the shaft 3 to generate force of friction therebetween, swings in agreement with the direction of rotation of the shaft 3. The range of swinging of the shutter 5 is limited by a stopper, not shown. The light-emitting diode 8 and the photo-transistor 9, which are disposed with the slits 1 of the rotary body 2 positioned therebetween, cooperate with each other to sense the passage of the slits 1 of the rotary body 2, then to output a rotation-amount signal from the photo-transistor 9. On the other hand, the light-emitting diode 10 and the photo-transistor 11, which are disposed with the slit 4 of the shutter 5 positioned therebetween, cooperate with each other to sense the position of the swinging shutter 5, then to output a rotation-direction signal from the photo-transistor 11.

Therefore, with the above-described embodiment, it is possible to detect both the amount of and the direction of the rotation of the shaft 3 on the basis of a rotation-amount signal output from the photo-transistor 9, and on the basis of a rotation-direction signal from the photo-transistor 11, respectively. Since the rotary body 2 does not have any position information patterns of two types, but it has only the slits 1, the rotary body 2 can be compact. Further, the slits 1 do not involve the need to give consideration to the shift in phase, the level of precision with which the encoder must be manufactured can be relatively low, thereby improving the mass-producibility of the encoder.

In the foregoing embodiment, although the spring 7 is arranged to cause force of friction between the shutter 5 and the shaft 3, the present invention is not intended to be limited thereto. Alternatively, a spring may cause force of friction between the shutter 5 and the rotary body 2.

FIG. 3 shows, in a vertical section, an embodiment of an image scanner according to the present invention, and FIG. 4 is a front view of the construction of that part of the image scanner enclosed by broken lines in FIG. 3.

The image scanner according to this embodiment includes, as shown in FIG. 3, a light source 22 for projecting light onto an original 21 with an image to be read, a self-scanning image sensor 24 adapted to receive the light reflected from the original 21 through a mirror 39 and a lens 23, a casing 25 accommodating the light source 22, the lens 23 and the image sensor 24, and serving as an outer shell of the image scanner, a reading opening 26 formed in a lower portion of the casing 25, a reading start switch 27 at an upper position of the casing 25, and rollers 28 arranged with their roller surfaces facing a direction substantially perpendicular to the self-scanning direction of the image sensor 24 (i.e., to the main scanning direction), and rotatably supported at lower positions of the casing 25. The image scanner also includes, as shown in FIG. 4, gears 29 and 30 through which the driving force of the rollers 28 is transmitted in the mentioned order, and a light-transmission-type encoder 31 engaging with the gear 30.

The encoder 31 includes a rotary body 33 having, on its periphery, slits 32 permitting light to be transmitted therethrough, a shaft 34 on which the rotary body 33 is integrally mounted, a shutter 36 being loosely and swingably fitted on the shaft 34 and having a slit 35, a spring (not shown) for causing force of friction between the shutter 36 and the shaft 34, a first detector 37 having a light-emitter and a light-receiver (neither of them being shown) which are disposed with the slits 32 of the rotary body 33 positioned therebetween, and a second detector 38 having a light-emitter and a light-receiver (neither of them being shown) which are disposed with the slit 35 of the shutter 36 positioned therebetween. The first detector 37 is mounted on a substrate 40 and is covered with a chassis 41, while the second detector 38 is mounted on another substrate 42. The swinging range of the shutter 36 is limited by the abutment of an end portion 36a of the shutter 36 on the chassis 41 as well as the abutment of another end portion 36b of the shutter 36 on the substrate 40.

With this embodiment, when the user, who is depressing the reading start switch 27, manually moves the scanner on the original 21, covering the original 21 in a direction perpendicular to the axis of the rollers 28, the light source 22 projects light through the reading opening 26 onto the original 21, and the image sensor 24 receives the light reflected from the original 21 through the mirror 39 and the lens 23, then outputs a signal indicative of the read image. During the movement of the image scanner, the rollers 28 rotate while rolling on the original 21, thereby causing, through the gears 29 and 30, the shaft 34 and the rotary body 33 of the encoder 31 to rotate. The encoder 31 operates, in a manner similar to the encoder shown in FIGS. 1 and 2, to detect the amount of and the direction of the rotation of the rollers 28, that is, to detect the amount of and the direction of movement performed by the image scanner relative to the original 21 in the sub-scanning direction, then to output detection signals.

Subsequently, the image signal and the detection signals are stored, in accordance with the direction of movement of the image scanner, in an image memory of the associated host computer, such as the image memory 47 of the host computer 46 shown in FIGS. 5 (a) and 5 (b). At this time, if the direction of movement of the image scanner is a forward-rotation direction, as shown in FIG. 5 (a), data expressed by the image signal are stored in such a manner that the storing starts from the first line area of the image memory 47. However, if that direction is a backward-rotation direction, as shown in FIG. 5 (b), the storing of the data starts from the last line area of the memory 47 so that the first line area stores the last-read items of the data. The image data stored in this way are read while maintaining their relative position, then the read data are output either as an image displayed on a monitor, such as the monitor 48, or as a hard copy obtained by a printer, not shown.

According to this embodiment of the image scanner, therefore, it is possible to obtain a displayed image which is always in the correct positional relation with the image on the original.

The present invention is not intended to be limited to the above-described. Alternatively, the order in which the data expressed by the image signal is stored in the image memory 47 may be fixed whichever the direction of movement is, and the data expressed by the image signal may be converted to assume the correct positional relation with the image on the original when the data is to be displayed on the monitor 48.

Further, if the image memory 47 comprises a video RAM on the monitor 48, it is possible to display the image-signal data on the monitor 48 without reading the data from the memory 47.

By virtue of the above-described construction of the light-transmission-type encoder according to the present invention, it is possible to detect both the amount of and the direction of rotation. Further, it is possible to improve the mass-producibility of the encoder as well as to render the rotary body compact, hence, to reduce production cost.

The above-described construction of the image scanner according to the present invention provides, in addition to the above-described advantages, an advantage in that it is possible to obtain a display image which is always in the correct positional relation with the image on the original irrespective of the direction of the movement of the image scanner.

What is claimed is:

1. A light-transmission-type encoder including a rotary body having on its periphery slits permitting light to be transmitted therethrough, said encoder being adapted to detect both the amount of rotation and the direction of rotation of the rotary body, said encoder comprising: a shaft on which said rotary body is integrally mounted; a shutter loosely and swingably fitted on said shaft; a spring for causing force of friction between said shutter, on one hand, and either said shaft or said rotary body, on the other; a first light-emitter and a first light-receiver which are disposed with said slits of said rotary body positioned therebetween; and a second light-emitter and a second light-receiver which are disposed with said shutter positioned therebetween.

2. A light-transmission-type encoder according to claim 1, further comprising a slit formed in said shutter, wherein said second light-emitter and said second light-receiver are disposed with said slit of said shutter positioned therebetween.

3. A light-transmission-type encoder according to claim 1, wherein said shaft has a small-diameter portion on which said shutter is loosely fit, and a large-diameter portion on which said rotary body is integrally mounted, said shutter abutting on the stepped surface between said small-diameter portion and said large-diameter portion.

4. A light-transmission-type encoder according to claim 3, further comprising a spring seat provided on said shaft and at a position opposed to and spaced from said large-diameter portion of said shaft, wherein a spring for causing force of friction between said shaft and said shutter is disposed in the space between said spring seat and said shutter.

5. An image scanner adapted to read an image while utilizing the self-scanning direction of a self-scanning image sensor as the main scanning direction and a direction substantially perpendicular to said main scanning direction as the sub-scanning direction, and transfer a signal indicative of the read image to image memory of a host computer so as to allow the image to be recorded and displayed, said image scanner comprising: a light-transmission-type encoder including a rotary body having on its periphery slits permitting light to be transmitted therethrough, a shaft on which said rotary body is integrally mounted, a shutter loosely and swingably fitted on said shaft, a spring for causing force of friction between said shutter, on one hand, and either said shaft or said rotary body, on the other, a first light-emitter and a first light-receiver which are disposed with said slits of said rotary body positioned therebetween, and a second light-emitter and a second light-receiver which are disposed with said shutter positioned therebetween; said image scanner detecting the direction of rotation of said rotary body on the basis of the relation in position of said shutter with said second light-emitter and said second light-receiver, and adjusting, in accordance with the detected direction of rotation, the position in which a signal indicative of the read image is stored in said image memory so as to allow a display of the image as it is in the correct positional relation with the image on the original irrespective of the direction of movement of the scanner body.

6. An image scanner according to claim 5, further comprising a slit formed in said shutter, wherein the image scanner detects the direction of rotation of said rotary body on the basis of the relation in position of said slit of said shutter with said second light-emitter and said second light-receiver.

7. An image scanner according to claim 5, wherein said first light-emitter and said first light-receiver are integrally incorporated in a first detector, and said second light-emitter and said second light-receiver are integrally incorporated in a second detector.

8. An image scanner according to claim 7, wherein said first detector is mounted on a substrate and covered with a chassis, and wherein, as said shutter swings, an end portion of said shutter abuts on either said substrate or said chassis.

* * * * *